United States Patent
Milatz et al.

(10) Patent No.: US 10,952,364 B2
(45) Date of Patent: Mar. 23, 2021

(54) FURROW OPENER WITH WINGS OVERLAPPING OPENER BODY

(71) Applicant: Dutch Blacksmith Shop Ltd., Pilot Butte (CA)

(72) Inventors: Rogan David Milatz, Weyburn (CA); Stuart Stobbs, Birch Hills (CA); Jarrett Hoffart, Regina (CA); Mike Booy, Emerald Park (CA); Dennis Duff, Regina (CA)

(73) Assignee: Dutch Blacksmith Shop Ltd., Manitoba (CA)

( * ) Notice: Subject to any disclaimer, the term of this patent is extended or adjusted under 35 U.S.C. 154(b) by 200 days.

(21) Appl. No.: 16/199,499

(22) Filed: Nov. 26, 2018

(65) Prior Publication Data
US 2020/0163273 A1    May 28, 2020

(51) Int. Cl.
*A01C 5/06*    (2006.01)
*A01C 11/00*    (2006.01)

(52) U.S. Cl.
CPC ............ *A01C 5/062* (2013.01); *A01C 11/006* (2013.01)

(58) Field of Classification Search
CPC .. A01C 5/062; A01C 5/06; A01C 5/00; A01C 11/006; A01C 11/00
See application file for complete search history.

(56) References Cited

U.S. PATENT DOCUMENTS

| | | | |
|---|---|---|---|
| 6,405,665 B1 | 6/2002 | Henry et al. |
| 7,506,594 B2 | 3/2009 | Bergen |
| 7,617,783 B1 | 11/2009 | Cruson |
| 9,032,885 B2 | 5/2015 | Cruson et al. |
| 9,750,175 B1 | 9/2017 | Wickstrom |

*Primary Examiner* — Christopher J. Novosad
(74) *Attorney, Agent, or Firm* — Ryan W. Dupuis; Kyle R. Satterthwaite; Ade & Company Inc.

(57) ABSTRACT

A furrow opener on an agricultural ground working implement has an opener body supported on a tool supporting shank of the implement and a replaceable furrowing tip body on the opener body. A delivery passage extends through the opener body and the tip body to deposit granular material in a furrow formed in the ground by the furrow opener. The tip body has a vertical knife portion and laterally protruding wings. Each wing further includes a soil shield portion projecting upwardly from the inner edge of the respective wing alongside the corresponding side surface of the opener body so as to resist penetration of soil into the chamber through a seam between the inner edge of the wing and the corresponding side surface of the opener body.

9 Claims, 8 Drawing Sheets

FURROW OPENER WITH WINGS OVERLAPPING OPENER BODY

FIELD OF THE INVENTION

The present invention relates to a furrow opener for use on a ground working agricultural implement in which the furrow opener includes a replaceable tip having a passage therethrough for depositing seed or granular fertilizer into a furrow formed in the ground by the opener.

BACKGROUND

Soil openers that have replaceable tips which feature a passageway through the tip body for seed or other granular products to exit can have problems with soil entering through the interface between the tip and the body and plugging of the product passageway. If the product passageway gets blocked, seed or fertilizer will not be placed in the soil, or at minimum, the product will not be placed where it was intended or at the desired quantity. When this happens, the producer may be fortunate and notice the blockage shortly after it occurs, in which case the operator can stop seeding and remove the soil from inside the tip. If the operator does not notice right away, they may seed for hours without any seed coming out of the plugged openers resulting in unseeded areas being left for weeds to grow and a less productive crop.

Current openers are designed so that the gap between the tip and the opener body is as small as possible so that the maximum amount of soil is blocked from getting inside the tip and affecting the flow of granular product. In many cases the tip and/or body are manufactured by casting, so without further machining processes to achieve a more accurate part, the gap has to be designed with casting tolerances in mind. This results in a gap that is not small enough to block enough soil in many cases. Even when the parts are machined for a tighter fit with only a 0.02 inch gap, there are still cases where enough soil still gets through the gap to plug off the product passageway.

SUMMARY OF THE INVENTION

According to one aspect of the invention there is provided a furrow opener for use with an agricultural implement supported for movement in a forward working direction and having a plurality of implement shanks, the furrow opener comprising:
  an opener body comprising:
  an upper shank mounting portion adapted to be mounted on a respective one of the implement shanks;
  an intermediate body portion extending downwardly from the upper shank mounting portion and having a pair of side surfaces oriented generally in the forward working direction at respective laterally opposing sides of the opener body;
  a lower mounting portion at a bottom end of the intermediate body portion; and
  a product delivery passage extending downwardly through the opener body;
  a furrowing tip body comprising:
  a tip mounting portion supporting the tip body on the lower mounting portion of the opener body such that the tip body is readily separable from the opener body;
  a knife portion projecting downwardly and forwardly from the tip mounting portion to a forward end of the tip body;
  at least one wing portion projecting rearwardly from the knife portion and laterally outwardly in relation to a corresponding one of the side surfaces of the opener body in which the wing portion includes an inner edge in close proximity with the corresponding side surface of the opener body;
  a hollow chamber within the tip body in communication between the product delivery passage of the opener body and an exit opening at a rear of said at least one wing portion; and
  a soil shield portion projecting upwardly from the inner edge of said at least one wing portion alongside the corresponding side surface of the opener body so as to resist penetration of soil into the chamber through a seam between the inner edge of said at least one wing portion and the corresponding side surface of the opener body.

The configuration of the soil shield portion extending upwardly alongside the side surface of the opener body serves to lengthen the path through the gap between the tip body and the opener body that the soil must travel to penetrate into the passageway of the tip body. The upright soil shield portion also raises the elevation of the exterior opening of the gap at the tip body and opener body interface which assists in minimizing soil penetration by lifting the exterior opening of the gap above a significant portion of the soil flowing around the opener body. The soil shield portion thus intentionally diverts the soil's trajectory away from the lower portion of the seam between the tip body and the opener body. Even where soil is still being forced into the seam, the soil has to be forced through a longer gap distance before it can get into the granular product passageway where it would affect the flow of granular product. The result is a considerable improvement in resisting soil penetration into the tip body which otherwise results in plugging of the opener body.

Where the tip meets the body, the more overlap between the two parts and the less gap width between the tip and the opener body, the less likely the opener will be to plug due to soil squeezing through the interface between the tip body and the opener body. In preferred embodiments, the soil shield portion overlaps across the side surface of the opener body by an overlap in the forward working direction and in height of at least 0.5 inches with no more than 0.125 inches of gap width. Accordingly, the soil has to move through the narrow gap over a distance of at least 0.5 inches before the soil can affect the flow of granular product through the tip. The long overlap of the soil shield portion alongside the side surfaces of the opener body results in the exterior of the interface gap between the tip and the body being further up on the opener so that it may be out of the soil entirely or at minimum is not as deep in the soil so that there is less force from the soil against the interface seam.

In the illustrated embodiment, an inner surface of the soil shield portion of said at least one wing portion spans alongside the corresponding side surface by a height which is greater than a thickness of the soil shield portion in a lateral direction between the inner surface and an outer surface thereof. More particularly, the height of the inner surface of the soil shield portion of said at least one wing portion may be more than double said thickness of the soil shield portion.

The outer surface of the soil shield portion extending above said at least one wing portion may be oriented nearer to vertical than horizontal in orientation. More preferably, the outer surface of the soil shield portion extends above said at least one wing portion in parallel with a corresponding inner surface of the soil shield portion of said at least one wing portion that spans alongside the corresponding side surface of the opener body.

The soil shield portion of said at least one wing portion may extend upwardly to a top end of the soil shield portion which is near in elevation to a top end of the knife portion.

When each wing portion includes a wall portion forming a portion of a boundary surrounding the hollow chamber of the tip body and the wall portion has a wall thickness defined between opposing inner and outer surfaces of the wall portion, preferably an inner surface of the soil shield portion of said at least one wing portion spans alongside the corresponding side surface a height which is greater than said wall thickness of the wall portion.

The soil shield portion is preferably stepped in profile so as to include a forward portion spanning along a first portion of the corresponding side surface of the intermediate body portion and a rearward portion spanning along a second portion of the corresponding side surface of the intermediate body portion which is stepped laterally outwardly in relation to the first portion.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
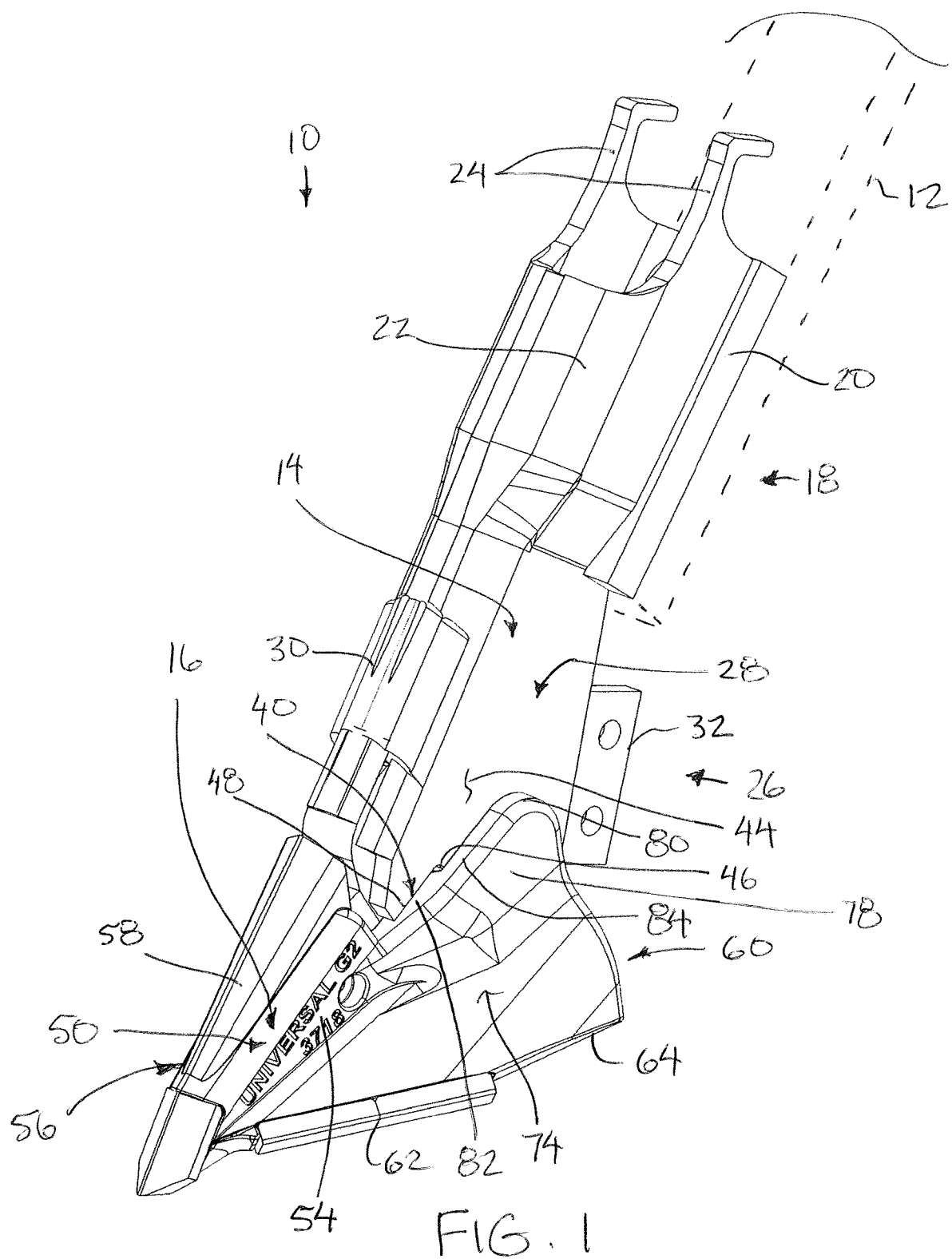
FIG. 1 is a perspective view of the furrow opener according to the present invention.
Figure 2:
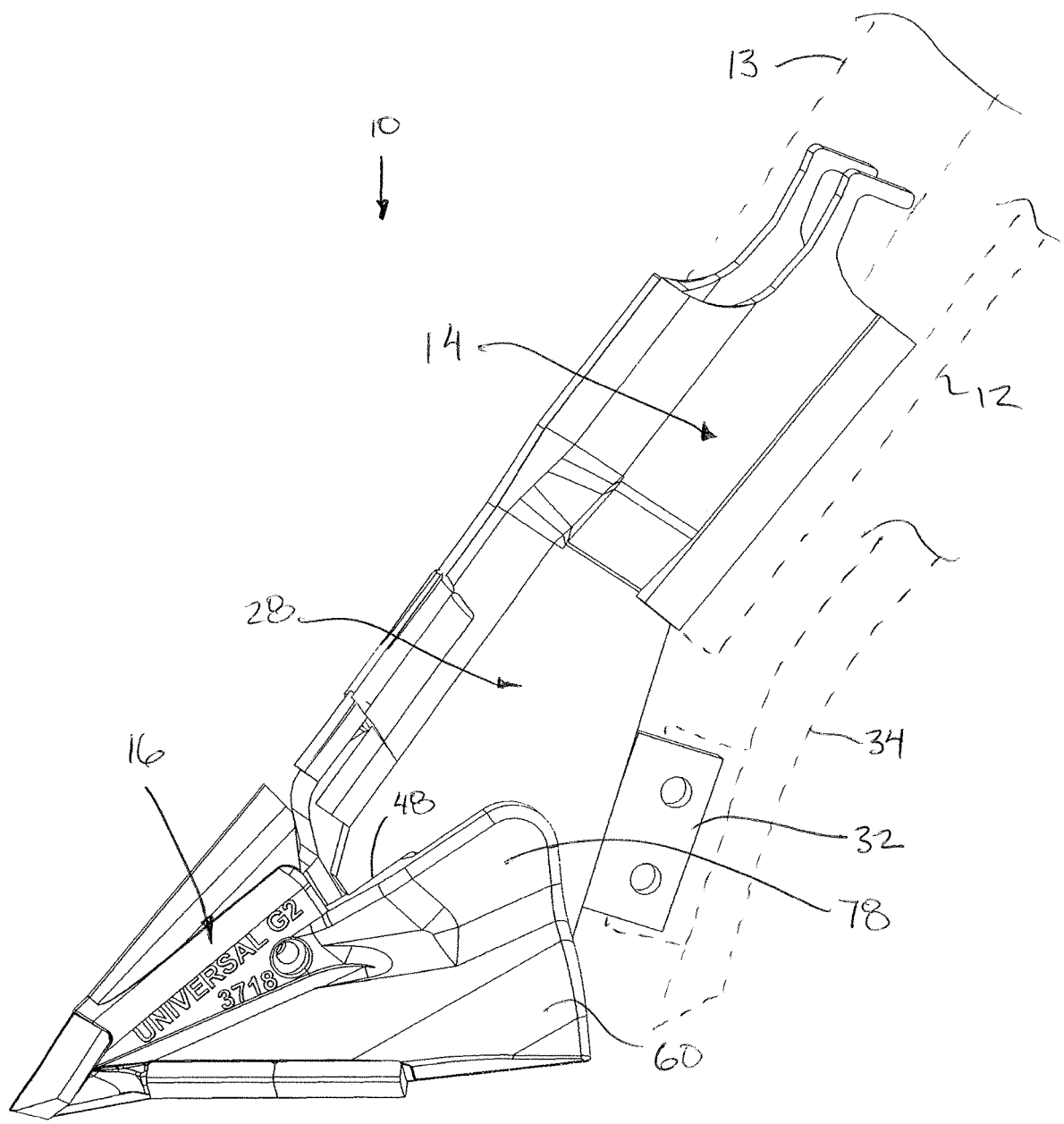
FIG. 2 is a side elevational view of the furrow opener.
Figure 3:
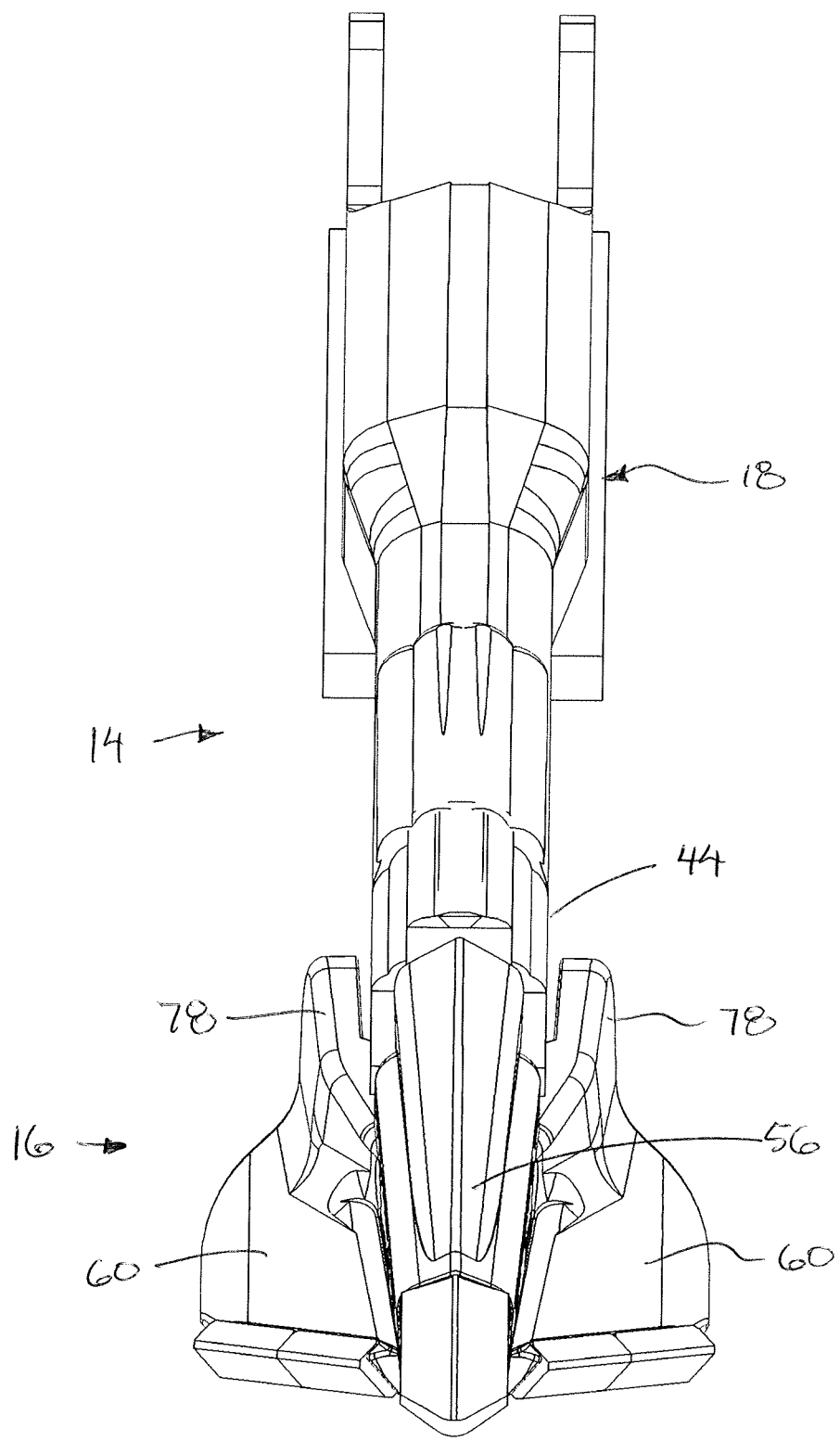
FIG. 3 is a front elevational view of the furrow opener.
Figure 4:
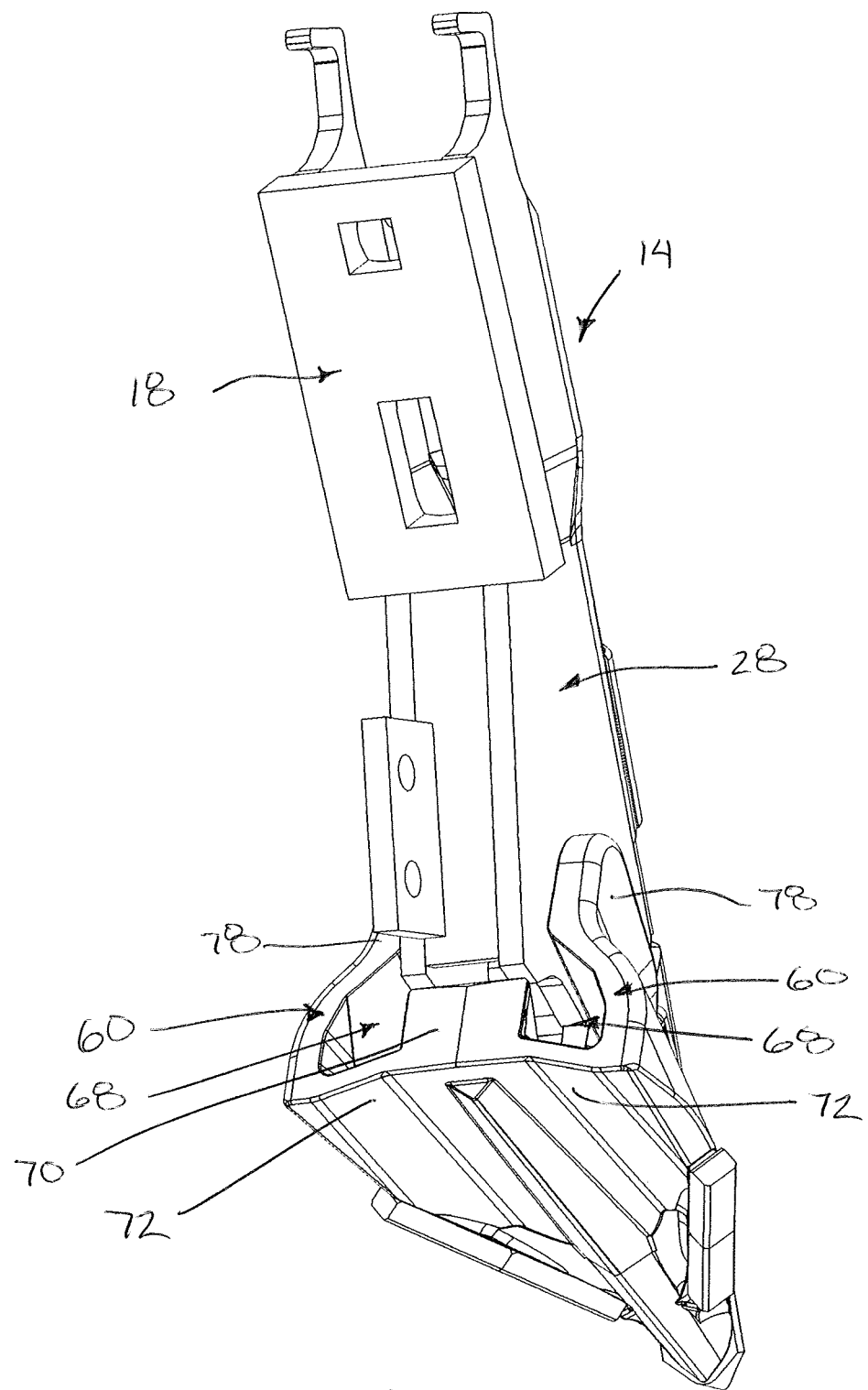
FIG. 4 is a perspective view of a rear side of the furrow opener.

Referring to the accompanying figures, there is illustrated a furrow opener generally indicated by reference numeral 10. The opener 10 is suited for use with a ground working agricultural implement, for example an air seeder.

The air seeder typically comprises a frame which is adapted to be connected to a towing vehicle, for example an agricultural tractor, for towing the frame in a forward working direction across the ground. A plurality of tool supporting shanks 12 are carried on the frame of the implement to extend downwardly at a forward slope in the working direction. Each of the shanks 12 is adapted for supporting a respective ground working tool thereon such as the opener 10 according to the present invention. The ground working tools form respective furrows in the ground as the frame is displaced in the forward working direction.

The air seeder typically also includes a pneumatic delivery system having a blower and a plurality of pneumatic delivery lines communicating from the blower to respective ones of the ground working tools on the implement shanks. A seed tank is supported for movement across the ground together with the implement frame for containing a granular material therein. A metering system delivers a metered quantity of the granular material from the tank into the pneumatic delivery lines such that the granular material is carried by a flow of air from the blower through the delivery lines to deposit the granular material in the respective furrows formed in the ground by the ground working tools.

The opener 10 generally comprises an opener body 14 adapted to be mounted on a respective one of the shanks 12 of the agricultural implement and a tip body 16 which is replaceably mounted on the opener body and which is suitably shaped for penetration into the ground to form a furrow in the ground when displaced in the forward working direction. The primary wear surfaces of the opener are located on the tip body such that the tip body can be replaced as it becomes worn.

The opener body 14 includes an upper shank mounting portion 18 at the top end thereof including a flat mounting plate 20 at the rear side of the body including fastener apertures therein so as to be adapted to secure the mounting plate against the leading face of the implement shank 12 using suitable fasteners. The upper shank mounting portion further includes a front wall 22 which is generally U-shaped in cross section so as to define a curved leading face and two side plates extending rearwardly from the curved leading face. The U-shaped front wall is oriented such that the open side of the U-shaped cross-section is enclosed by the rear plate 20 so that the rear plate and the front wall collectively define the perimeter boundary of an upper seed passage extending longitudinally through the opener body for communication with the tip body at the bottom end of the opener body.

The upper seed passage is open at the top end of the opener body so as to receive the terminal end of one of the product delivery lines 13 of the air seeder inserted therein. A pair of mounting posts 24 extend longitudinally outward from the opener body at diametrically opposing sides in relation to the upper seed passage to enable the product delivery line 13 to be mounted in fixed relation to the opener body using a hose clamp which surrounds the product delivery line and the two posts 24 collectively.

The opener body further includes an intermediate body portion 26 which extends downwardly and forwardly at a slope from the upper mounting portion 18 so as to surround an intermediate seed passage extending through the intermediate body portion to a bottom opening at the bottom of the opener body. The intermediate body portion includes a pair of side surfaces 28 which are parallel and spaced apart at laterally opposing sides of the opener body in which each side surface 28 spans a majority of the area of the respective side of the opener body. An insert 30 of wear resistant material is mounted at a leading side of the intermediate body portion.

An upright mounting plate 32 is mounted at the rear side of the intermediate body portion 26 to extend rearwardly therefrom in parallel relation to the forward working direction. The mounting plate 32 includes a pair of apertures therein to enable an auxiliary delivery tube 34 to be selectively mounted thereon in a trailing relationship relative to the opener body so that the tube 34 can be connected to its own respective product delivery line of the agricultural implement. In a typical arrangement, the delivery line 13 that is connected to the seed passage extending through the opener body receives a first granular material such as seed therein, whereas the second tube 34 connected rearwardly of the opener body receives a second material such as granular fertilizer or liquid fertilizer to be dispensed therefrom in trailing relationship with the opener.

The opener body 14 further includes a lower mounting portion 36 extending downwardly and forwardly from the bottom end of the intermediate body portion for supporting the tip body 16 thereon. More particularly the lower mounting portion comprises a forward projecting lug having a lateral width which is less than the overall width of the intermediate body portion of the opener body so as to be stepped laterally inwardly in relation to both side surfaces of the intermediate body portion. The lug forming the lower mounting portion is tapered in height in the forward working direction towards a forward apex which is inserted into a corresponding socket in the tip body 16 as described in further detail below. A transverse pin aperture 38 is provided in the lug forming the lower mounting portion for alignment with corresponding apertures in the tip body 16 to receive a retainer pin inserted therethrough which serves to retain the tip body on the opener body.

The intermediate body portion includes two mounting recesses 40 formed in the two side surfaces thereof respectively adjacent the bottom end of the opener body and adjacent the front side of the intermediate body portion so as to be in trailing relationship immediately rearward of the lug forming the lower mounting portion 36. The mounting recesses 40 result in the side surfaces of the intermediate body portion having a first portion 42 at the location of the recesses where the side surfaces are parallel and spaced apart by a spacing which is stepped laterally outwardly and wider in relation to side surfaces of the lower mounting portion 36 while being spaced apart by a distance which is narrower than the overall width between the side surfaces of the intermediate body portion along a main second portion 44 thereof that occupies the majority of the area of the side surfaces of the opener body. The side surfaces at the second portion 44 are thus stepped laterally outwardly in relation to the corresponding first portions 42 of the side surfaces to define a forward shoulder 46 therebetween in which the forward shoulder surface 46 faces in the forward working direction of the opener body.

Due to the mounting recesses 40 being formed at the bottom of the intermediate body portion of the opener body, some of the second portion 44 of the side surfaces of the opener body extend above the first portions 42 of the side surfaces so that the areas immediately above the mounting recesses 40 of the opener body are also stepped laterally outwardly to define lower shoulders 48 on the opener body which are sloped downwardly and forwardly and which face downwardly in the normal orientation of the opener.

The tip body 16 shown in the accompanying figures includes a tip mounting portion 50 at an intermediate location within the tip body which forms the socket 52 therein that receives the lower mounting portion 36 of the opener body inserted therein. The tip mounting portion 50 surrounds the lower mounting portion 36 of the opener body and includes a pair of side walls 54 at laterally opposing sides of the tip mounting portion which locate respective cooperating apertures therein for alignment with the pin aperture 38 in the lower mounting portion of the opener body in the mounted position of the tip body on the opener body to receive the retainer pin inserted therethrough.

The tip body further includes a knife portion 56 comprising an upright front face 58 which is elongate and extends downwardly and forwardly at a slope across the full width between the side walls 54 of the tip mounting portion 50. The side walls 54 at laterally opposing sides of the front face 58 of the knife portion are oriented generally in the forward working direction at an overall lateral width therebetween which is approximately equal to or slightly less than the overall width of the opener body at the second portion 44 of the side surfaces thereof. The upright front face 58 of the knife portion terminates at a bottom end defining the lowermost portion of the tip body for forming the bottom apex of the furrow in the ground.

The tip body 16 further includes two wing portions 60 at laterally opposing sides of the knife portion. Each wing includes a leading edge 62 extending rearwardly at a laterally outward slope from opposing sides of the bottom of the knife portion 56. An upper surface of each wing is sloped upwardly and rearwardly from the respective leading edge 62 thereof to a rear side of the tip body and at a rear side of the opener body upon which the tip body is supported. In relation to the side surfaces of the opener body, the wings 60 extend laterally outwardly to respective outer edges 64 of the wings defining the overall lateral width of the tip body therebetween. The outer edges 64 extend rearwardly from the outermost end of the leading edges 62 respectively.

The tip body includes a hollow chamber 66 formed therein rearwardly of the tip mounting portion so as to openly communicate with the bottom end of the seed passage extending through the upper and intermediate body portions of the opener body. The hollow chamber 66 extends partway into each of the wings 60 such that the hollow chamber 66 communicates with a pair of outlets 68 formed at the rear side of the tip body within the pair of wings 60 respectively. The outlets are laterally offset at opposing sides relative to the knife portion of the tip body which is centrally located therebetween in the lateral direction. The tip body further includes a rear wall 70 which is upright in orientation at the rear of the tip body to separate the pair of outlets 68 and enclose a portion of the rear side of the hollow chamber 66 within the opener body.

Due to the hollow chamber 66 extending partway into each of the wings 60, each wing effectively comprises a bottom wall 72 at a bottom side of the tip body and an upper wall 74 extending over part of the chamber 66. The bottom wall extends laterally inwardly from a respective outer edge 64 of the wing for connection to the bottom wall 72 of the other wing so as to collectively form a bottom boundary of the hollow chamber 66. The upper wall 74 extends laterally inwardly at an upward slope from the respective outer edge 64 and the respective leading edge 62 where the upper and bottom walls are joined with one another. The upper wall 74 terminates at an inner edge 76 located adjacent to and in close proximity to the respective side surface of the intermediate body portion of the opener body so that a remaining gap is approximately 0.125 inches or less. The upper wall 74 has a wall thickness which is defined in a lateral direction between inner and outer surfaces of the wall respectively.

The opener body further includes a soil shield portion 78 in the form of an upright wall which extends upwardly from the inner edge 76 of each wing so as to lie generally flat alongside the corresponding side surface of the intermediate body portion of the opener body. The soil shield portion 78 has an inner surface lying generally parallel and adjacent to the corresponding side surface of the opener body so as to lie in close proximity alongside the side surface of the opener body by a gap of approximately 0.125 inches or less across a full height of the soil shield portion from the inner edge of the upper wall 74 of the respective wing to the top end 80 of the upright wall. The top end 80 is approximately at the same height or greater in elevation than the top end of the knife portion in the normal working orientation of the opener.

The upright wall of the soil shield portion 78 is stepped in profile along the inner side thereof to accommodate the stepped profile of the side surface of the intermediate body portion. More particularly the soil shield portion includes a forward portion 82 in alignment with the first portion 42 of the side surface of the opener body and a rearward portion 84 in alignment with the second portion 44 of the side surface of the opener body.

In this manner, the forward portions 82 of the inner surface of the pair of soil shield portions 78 are generally parallel to one another and spaced apart by a lateral distance corresponding to the lateral width of the opener body at the first portions 42 thereof. The forward portion 82 of the upright wall of the soil shield portion 78 has a top edge which is sloped upwardly and rearwardly immediately below the lower shoulder 48 on the opener body such that a top/rear end of the forward portion 82 is situated in proximity to the forward shoulder 46 on the opener body at a location which is upwardly and rearwardly relative to a bottom or leading end of the lower shoulder 48.

In this arrangement, the interface seam between the wings of the tip body and the opener body are open in a laterally outward direction which is partly shielded behind the overhanging lower shoulder 48 on the opener body along the forward portions 82 of the soil shield portions.

The rearward portion 84 of each soil shield portion 78 is stepped laterally outwardly relative to the corresponding forward portion so that the inner surfaces of the rearward portions 84 are generally parallel and spaced apart from one another by a lateral distance corresponding approximately to the overall width of the intermediate body portion of the opener body at the second portion 44 of the side surfaces thereof. In this manner, the interface seam between the wings of the tip body and the opener body are open in an upward direction along a length in the working direction of the rearward portion 84 of the soil shield portions.

Figure 5:
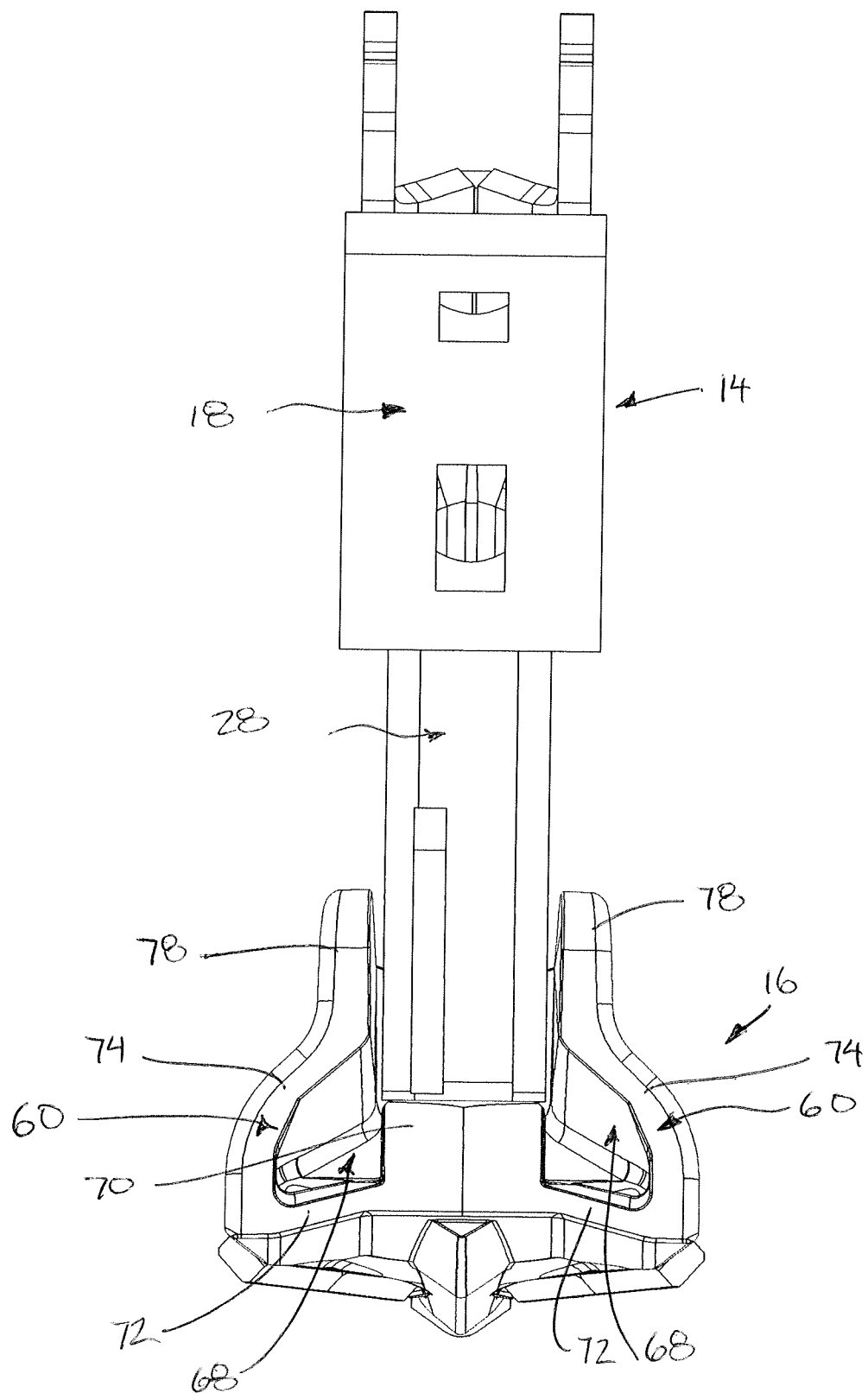
FIG. 5 is a rear elevational view of the furrow opener.
Figure 6:
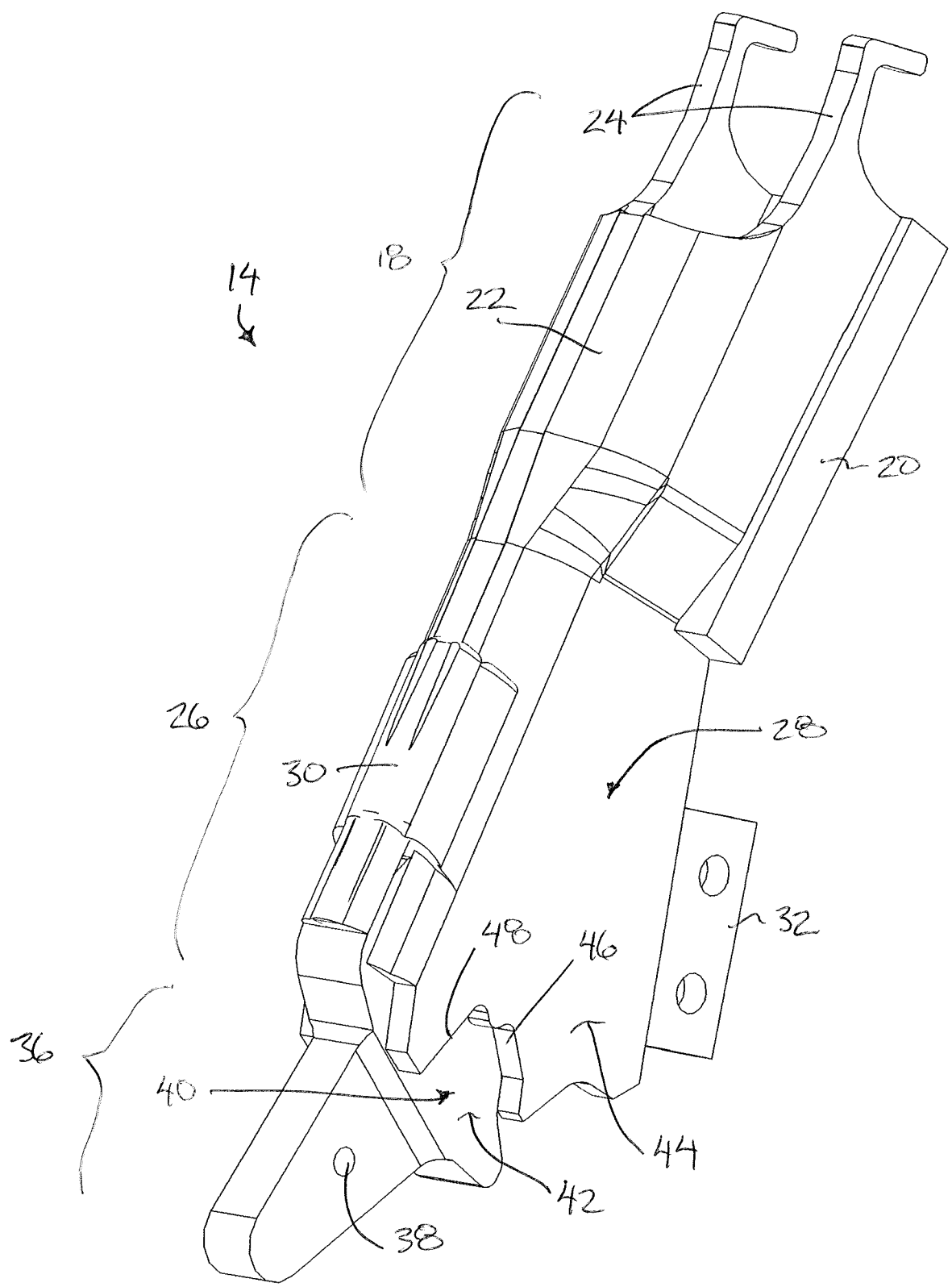
FIG. 6 is a perspective view of the opener body of the furrow opener with the tip body shown removed.
Figure 7:
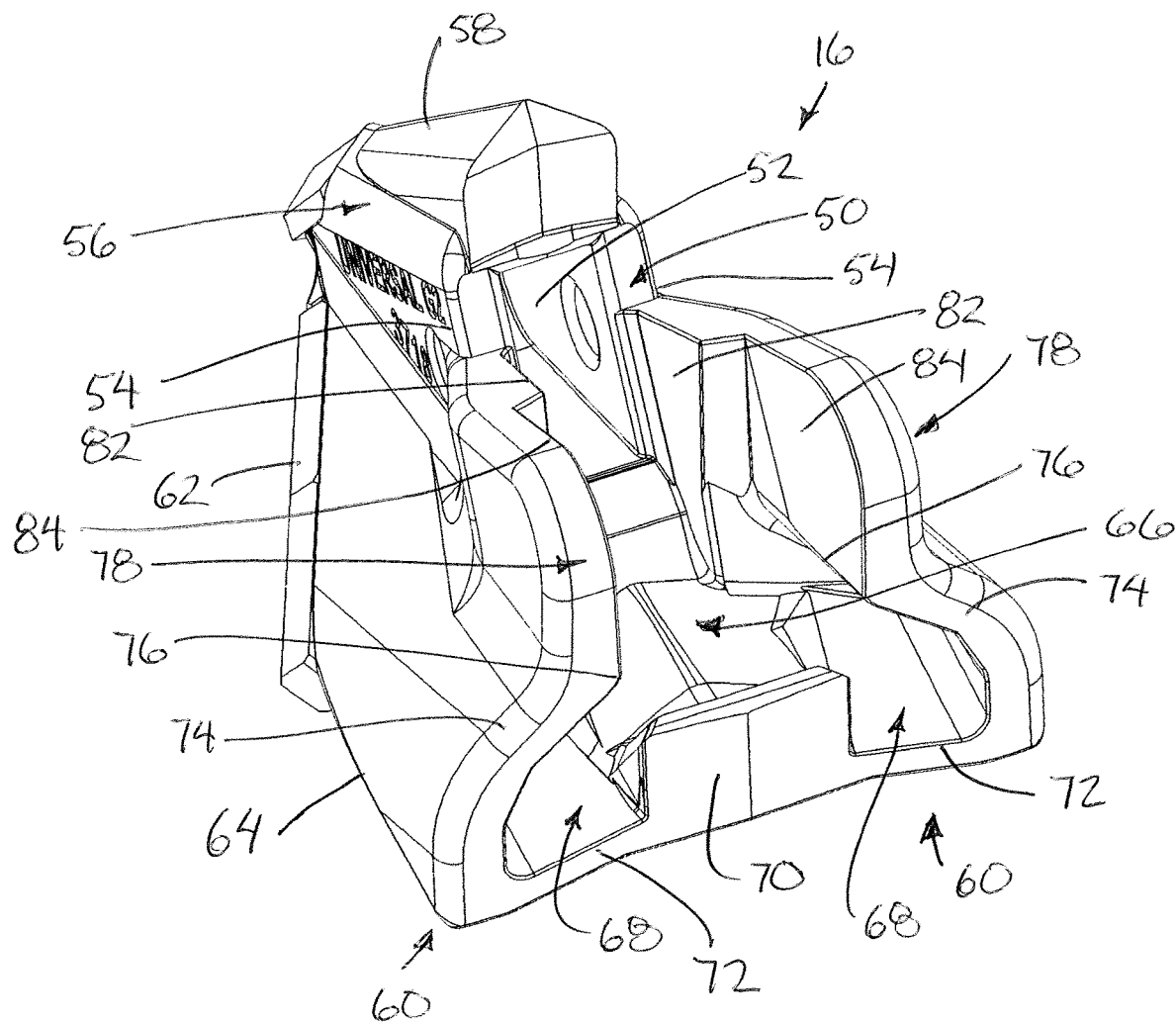
FIG. 7 is a perspective view of a rear side of the tip body of the furrow opener shown separated from the opener body.
Figure 8:
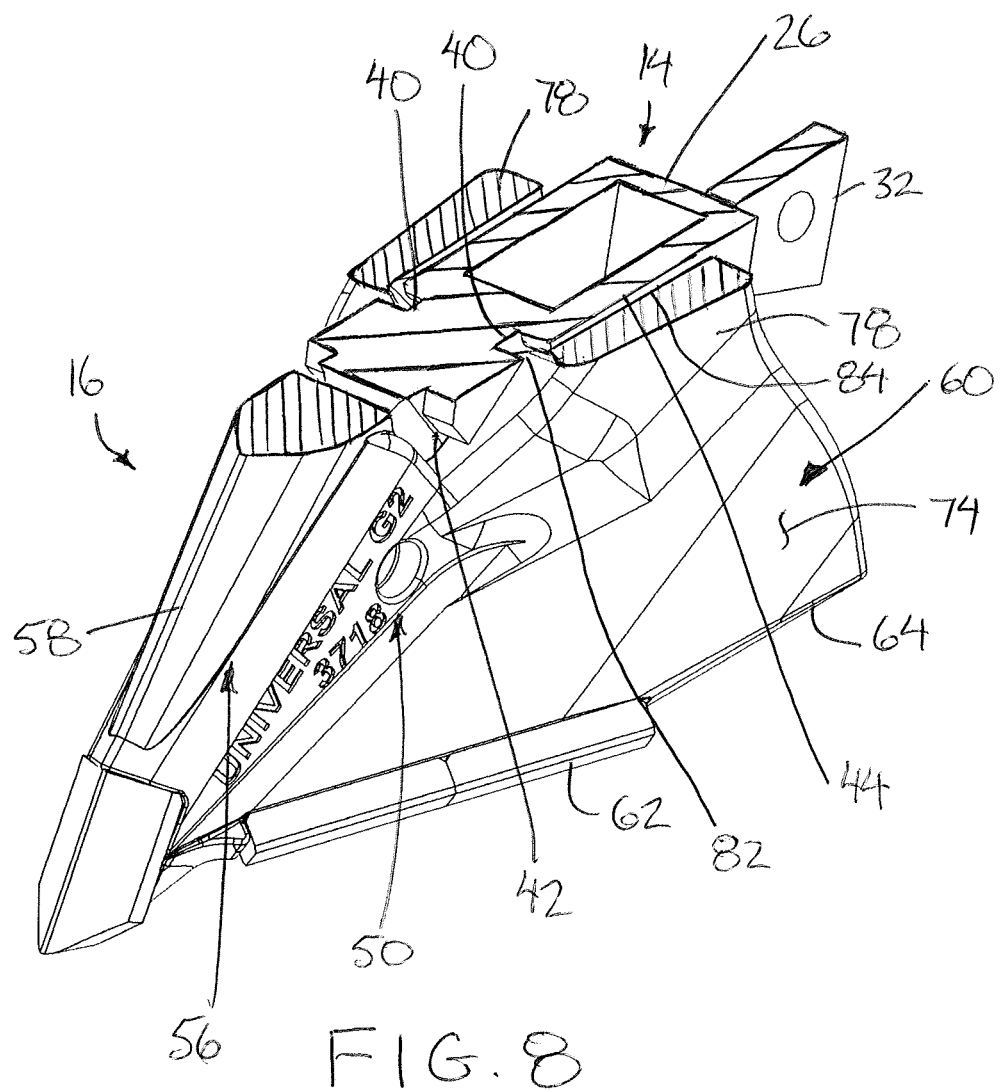
FIG. 8 is a partly sectional view of the opener body.

The upright wall forming each soil shield portion has an outer surface which is near parallel to the inner surface extending alongside the side surfaces of the opener body. The wall thickness in a lateral direction between the inner and outer surfaces of each soil shield portion is comparable to the wall thickness of the upper wall of the wings so as to be much smaller than the height that the inner surface of the soil shield portion spans alongside the opener body. More particularly, the height of the inner surface of the soil shield portions spanning alongside the opener body is more than double, that is 3 to 4 times a greater than, the wall thickness of the upright walls of the soil shield portions. As shown in FIG. 5, the height that the inner surface of each soil shield portion spans along the side surfaces of the opener body is approximately equal to the height of the outlet openings at the rear of the tip body. The inner surface thus spans a distance of approximately 1 inch across the corresponding side surfaces of the opener body.

Any soil being forced into the interface seam between the wings of the tip body and the side surfaces of the opener body must thus travel through a narrow gap of 0.125 inches or less across a distance of approximately 1 inch or greater in order for the soil to reach the hollow chamber within the tip body such that penetration of soil into the hollow chamber of the tip body is greatly reduced or substantially eliminated by the configuration of the soil shield portions 78 on the tip body.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A furrow opener for use with an agricultural implement supported for movement in a forward working direction and an implement shank, the furrow opener comprising:
    an opener body comprising:
        an upper shank mounting portion adapted to be mounted on the implement shank;
        an intermediate body portion extending downwardly from the upper shank mounting portion and having a pair of side surfaces oriented generally in the forward working direction at respective laterally opposing sides of the opener body;
        a lower mounting portion at a bottom end of the intermediate body portion; and
        a product delivery passage extending downwardly through the opener body;
    a furrowing tip body comprising:
        a tip mounting portion supporting the furrowing tip body on the lower mounting portion of the opener body such that the furrowing tip body is readily separable from the opener body;
        a knife portion projecting downwardly and forwardly from the tip mounting portion to a forward end of the furrowing tip body;
        at least one wing portion projecting rearwardly from the knife portion and laterally outwardly in relation to a corresponding one of the side surfaces of the opener body in which the at least one wing portion includes an inner edge in proximity to the corresponding side surface of the opener body;
        a hollow chamber within the furrowing tip body in communication between the product delivery passage of the opener body and an exit opening at a rear of said at least one wing portion; and
        a soil shield portion projecting upwardly from the inner edge of said at least one wing portion alongside the corresponding side surface of the opener body so as to resist penetration of soil into the chamber through a seam between the inner edge of said at least one wing portion and the corresponding side surface of the opener body.

2. The furrow opener according to claim 1 wherein an inner surface of the soil shield portion of said at least one wing portion spans alongside the corresponding side surface a height which is greater than a thickness of the soil shield portion in a lateral direction between the inner surface and an outer surface thereof.

3. The furrow opener according to claim 2 wherein said height of the inner surface of the soil shield portion of said at least one wing portion is more than double said thickness of the soil shield portion.

4. The furrow opener according to claim 2 wherein an outer surface of the soil shield portion extending above said at least one wing portion is oriented nearer to vertical than horizontal in orientation.

5. The furrow opener according to claim 1 wherein the outer surface of the soil shield portion extending above said at least one wing portion is parallel to a corresponding inner surface of the soil shield portion of said at least one wing portion that spans alongside the corresponding side surface of the opener body.

6. The furrow opener according to claim 1 wherein the soil shield portion of said at least one wing portion extends upwardly to a top end of the soil shield portion which is near in elevation to a top end of the knife portion.

7. The furrow opener according to claim 1 wherein said at least one wing portion includes a wall portion forming a portion of a boundary surrounding the hollow chamber of the furrowing tip body in which the wall portion has a wall thickness between opposing inner and outer surfaces of the wall portion, and wherein an inner surface of the soil shield portion of said at least one wing portion spans alongside the corresponding side surface a height which is greater than said wall thickness of the wall portion.

8. The furrow opener according to claim 1 wherein the soil shield portion is stepped in profile so as to include a forward portion spanning along a first portion of the corresponding side surface of the intermediate body portion and a rearward portion spanning along a second portion of the corresponding side surface of the intermediate body portion which is stepped laterally outwardly in relation to the first portion.

9. The furrow opener according to claim 1 wherein said at least one wing portion includes a sloped upper surface and wherein the soil shield portion of said at least one wing portion extends upwardly above the sloped upper surface of the at least one wing portion.

\* \* \* \* \*